United States Patent [19]

Shibata

[11] 3,857,946
[45] Dec. 31, 1974

[54] ADDITION OF HYDROXAMIC ACID DERIVATIVES TO FEEDS FOR REDUCING ODOR OR POULTRY EXCREMENT

[75] Inventor: Akio Shibata, Okazaki, Japan

[73] Assignee: Eisai Co., Ltd., Tokyo, Japan

[22] Filed: Dec. 28, 1973

[21] Appl. No.: 429,296

Related U.S. Application Data

[63] Continuation of Ser. No. 168,496, Aug. 2, 1971, abandoned.

[30] Foreign Application Priority Data

Apr. 22, 1971 Japan.............................. 46-25662

[52] U.S. Cl..................... 424/266, 424/324, 426/2, 426/342, 426/807
[51] Int. Cl............................................ A61k 15/12
[58] Field of Search ....... 426/2, 342, 374, 805, 807; 424/320, 248, 324, 315, 327, 266

[56] References Cited
UNITED STATES PATENTS

| | | | |
|---|---|---|---|
| 3,364,110 | 1/1968 | Hanina.............................. | 167/53.1 |
| 3,444,232 | 5/1969 | Bernstein............................ | 260/453 |
| 3,446,630 | 5/1969 | Beereboom.......................... | 99/150 |
| 3,474,132 | 10/1969 | Bernstein.......................... | 260/500.5 |
| 3,714,361 | 1/1973 | Morimoto........................... | 424/320 |

Primary Examiner—A. Louis Monacell
Assistant Examiner—Hiram H. Bernstein
Attorney, Agent, or Firm—Wenderoth, Lind & Ponack

[57] ABSTRACT

An improved feed for domestic animals and poultry consisting of an essential amount of conventional feed and an effective amount of a hydroxamic acid compound represented by the general formula

R — CONH — OH wherein R is an alkyl, substituted or unsubstituted aryl or pyridyl. Concentration of the ammonia in feces of the domestic animals and poultry and accordingly an unpleasant smell evolved from the feces are considerably reduced, when they are reared with said improved feed. The animal- and poultry-houses may be kept in clean and hygienic conditions and a high performance of growth and/or a high egg-productivity of the domesticated animals and poultry are attained.

5 Claims, No Drawings

ADDITION OF HYDROXAMIC ACID DERIVATIVES TO FEEDS FOR REDUCING ODOR OR POULTRY EXCREMENT

This is a continuation, of application Ser. No. 168,496, filed Aug. 2, 1971 and now abandoned.

This invention relates to an improved feed for domestic animals and poultry. More particularly, the invention relates generally to the animal feed which additionally contains a small amount of a hydroxamic acid derivative represented by the general formula $$R - CONH - OH$$

wherein R stands for alkyl, substituted or unsubstituted aryl or pyridyl.

The term "domestic animals and poultry" used herein and elsewhere in the present specification and claim designates collectively all the animals and birds which have been domesticated and includes cattle, horse, hen and cock, sheep, goat, pigeon, turkey, cat, dog and many other species of animals and birds.

Unpleasant smell sent out from the animal- and poultry houses, such as chicken-yard, pigger and the like is more strengthened by the ammonical gases evolved from the excrements such as feces and urine of the animals and poultry.

The unpleasant smell often annoys the people in the neighbourhood to cause an environmental pollution. It disturbs the growth of the young animals and poultry and decreases the egg-laying performance. Furthermore, a continuous and prolonged inhalation of such injurious gases tends to be the primary cause of respiratory diseases of the domestic animals and poultry. (See, for example, the articles reported in 1966 by Charles et al of Nottingham University and by D. P. Anderson et al of Wisconsin University.)

No attempt has been known to reduce concentration of the ammonia in the feces for the purpose of removing such evel smell and also preventing the animals and poultry from suffering the diseases caused by such smell.

Surprisingly, it has been observed, as a result of various experiments carried out by the present inventor, that the content of ammonia in the feces of the domestic animals and poultry is considerably diminished when such animals and poultry are reared with a particular feed of the present invention. The said particular feed is prepared by admixing a conventional feed with a certain amount of the hydroxamic acid compound represented by the aforementioned chemical formula.

A primary object of the present invention is thus to provide an improved feed for the domestic animals and poultry so that they may excrete feces of a low content of ammonia.

Another object of the present invention is to provide an improved feed adaptable for keeping the animal- and poultry-houses in clean and hygienic conditions and also for creating a favorable environment where the animals and poultry may be constantly brought up in good health.

It should be understood that the term "substituted or unsubstituted aryl radical," which among others may be contained in the specified hydroxamic acid compound, embraces not only a simple aryl radical but also the substituted aryl radical such as substituted phenyl wherein the benzene ring thereof contains a substituent or substituents.

Illustrative of the said hydroxamic acid compound that may advantageously be employed for carrying out the present invention includes benzohydroxamic acid, nicotinohydroxamic acid, p-nitrobenzohydroxamic acid, p-chlorobenzohydroxamic acid, p-methylbenzohydroxamic acid, p-methoxybenzohydroxamic acid, caprylohydroxamic acid, o-methylbenzohydroxamic acid, o-chlorobenzohydroxamic acid, o-methoxybenzohydroxamic acid and the like.

In practice of the present invention, the amount of the substituted hydroxamic acid to be incorporated into the contemplated feed is variable depending upon the species of animals and poultry to be reared. It has been found that an addition of the said compound within the range of 20–100 p p m is usually preferable and is recommendable.

The aforementioned particular technical merits achievable by the present invention will be hereinunder illustrated by the experiments wherein a feed was employed which contains caprylohydroxamic acid as a typical additive.

EXPERIMENT 1

200 Broilers were used in this experiment. The chickens were at random divided into four groups A, B, C and D, each of which contains 50 chickens.

Four groups A', B', C' and D' in equal amount of a well-controlled composite formula feed but containing no antibiotics were taken as the basis of the feed under test. The groups of the feed were respectively admixed with the individual amounts of caprylohydroxamic acid as follows:

| Groups | A' | B' | C' | D' |
|---|---|---|---|---|
| Amount of caprylohydroxamic acid (p p m) | — | 25 | 50 | 100 |

The resulting feeds B', C' and D' were respectively given to the groups B, C and D of the chickens, while the feed A' was given to the group A of the chickens as control. The breedings were continued for total 70 days. During the first 21 day breedings, the chickens were brought up in a battery brooder provided with an electric heating device, while for the remaining 49 day breedings, the chickens were reared in the ordinary level-floored poultry-house.

At the end of the above breedings, three chickens were at random taken from the respective groups and killed. The quantities of ammonia in the contents of the rectums and also in the blood of portal veins of the killed chickens were determined as follows:

a. For the purpose of determining the ammonia present in the content of the rectum, a part of the rectum in 6–7 cms length was cut off and its content was weighed into a centrifuging glass tube. An amount of a 10 percent aqueous solution of trichloroacetic acid was added to cause separation of the protein contained therein. After allowing to stand for a while, the content of the tube was subjected to centrifuge. The supernatant clear solution in the tube was recovered, which was then subjected to a quantitative estimation of the free ammonia by means of a micro-Kjeldahl method.

b. The experiments were conducted on the chickens of the groups A, B, C and D in the same manner as above-mentioned.

Concentration of the ammonia in the blood of portal vein was, however, estimated in accordance with the "direct colorimetric quantitative determination of ammonia in blood" developed by Takumichi Okuda and Setsuro Fujii reported in the Japanese Journal entitled "Saikin Igaku" (Recent Medical Science), 21 (3), 622 (1966).

The results obtained in the above experiments are tabulated in Table 1.

Table 1

| Groups | A (control) | B | C | D |
|---|---|---|---|---|
| Ammonia concentration in mg/g in the content of rectum | 0.265 | 0.270 | 0.188 | 0.133 |
| Ammonia concentration in $\mu$g/ml in blood of the portal vein | 3.66 | 3.38 | 3.43 | 3.25 |

From the dta given in the above Table 1, it is noted:

1. The concentrations of ammonia in the contents of rectums were suppressed in proportion to the quantities of caprylohydroxamic acid added to the basic feed. In comparision with Group A as control, a marked diminution in the concentration of ammonia is observed when the feeds were given which contain caprylohydroxamic acid in an amount within the range of 50–100 p p m of the basic feed.

2. Lowering in the concentration of ammonia is also observed in the blood of portal vein in proportion to the quantity of the added caprylohydroxamic acid. It is surmised that the difference between the concentrations of ammonia shown in the Table indicates the decrease of the quantity of ammonia absorved through intestines and that the concentration of ammonia in the blood of portal vein reflects to the concentration of ammonia present in the content of rectum.

EXPERIMENT 2

Ten young Berkshire pigs at 60 days old were taken at random which were then divided into three groups, namely, group A with 4 piglets, group B with 3 piglets and group C with 3 piglets.

Three groups A', B' and C' of equal amounts of a well-controlled composite formula feed but containing no antibiotics were taken. To the feeds of groups B' and C' were added respectively the following amounts of caprylohydroxamic acid, while the group A' was retained as control without addition of caprylohydroxamic acid.

| Groups | A'(control) | B' | C' |
|---|---|---|---|
| Amounts of caprylohydroxamic acid added (p p m) | — | 50 | 150 |

The piglets were reared for 150 days in a concrete-floored pen.

After the 90 days breeding and at 150 days old, the quantity of free ammonia contained in the feces were estimated in accordance with the micro-Kjeldahl method as aforementioned.

The results obtained were tabulated:

Table 2

| Groups | A | B | C |
|---|---|---|---|
| Quantity of caprylohydroxamic acid added (p p m) | nil (Control) | 50 | 150 |
| Ammonia concentration in feces (mg/g) | 0.678 | 0.382 | 0.335 |

From the data given in the above Table, it is seen that the concentration of ammonia in the feces are reduced to about half of that of the control, when the piglets were reared with the feed containing the amounts of the caprylohydroxamic acid.

EXPERIMENT 3

Ten Japanese brown cattles weighing an average of about 200 kg were divided into two groups A and B in equal numbers, the group A having been provided for control.

The animals of the group A were reared with a conventional feed concentrate contained no additive, while the animals of the group B were reared with the feed which contained 50 p p m of caprylohydroxamic acid.

Breeding of the cattles of the groups A and B were continued for 60 days in a Stanchion type stall.

At the end data the experiment, feces were raked out from the rectums of the respective animals, and the concentrations of the ammonia in the feces were estimated by means of the micro-Kjeldahl method as above mentioned.

The following results were thus obtained:

| Groups | A (control) | B |
|---|---|---|
| Concentration of ammonia (meg/g) | 658.5 | 414.3 |

As is evident from the above, the concentration of ammonia in the feces of the rectum is reduced to about two third of that of the control, when the animals were reared with the feed containing caprylohydroxamic acid.

The following examples are illustrative of the preferred embodiments of the present invention.

EXAMPLE 1

Feed for chicken in a fostering stage was prepared by adding 50 p p m of caprylohydroxamic acid to a conventional formula feed for a starting ration.

Similarly, feed for adult domestic fowl was prepared in the same manner as the above, but using a conventional formula feed for a finishing ration, instead of the conventional feed for the starting ration.

EXAMPLE 2

Feeds for swine were prepared by adding respectively 10 p p m of nicotinohydroxamic acid to a conventional milk replacer, on the one hand, and to a conventional finishing ration, on the other.

EXAMPLE 3

Formula feeds for chicken in a fostering stage and for adult domestic fowl were prepared by adding each 100 p p m of acetohydroxamic acid instead of 50 p p m of caprylohydroxamic acid used in the above Example 1.

EXAMPLE 4

A feed for cattle was prepared by adding 50 p p m of benzohydroxamic acid to a concentrate of conventional feed for cattle.

What is claimed is:

1. A method of reducing the objectionable odor of poultry excrement which consists essentially of feeding to the poultry a poultry feed having incorporated therein 20 to 100 ppm of a hydroxamic acid selected from the group consisting of acetohydroxamic acid, caprylohydroxamic acid, unsubstituted benzohydroxamic acid, nicotinohydroxamic acid, p-nitrobenzohydroxamic acid, p-chlorobenzohydroxamic acid, p-methoxybenzohydroxamic acid, p-methylbenzohydroxamic acid, o-methylbenzohydroxamic acid, o-chlorobenzohydroxamic acid and o-methoxybenzohydroxamic acid.

2. A method according to claim 1 wherein the hydroxamic acid is nicotinohydroxamic acid.

3. A method according to claim 1 wherein the hydroxamic acid is acetohydroxamic acid.

4. A method according to claim 1 wherein the hydroxamic acid is an unsubstituted benzohydroxamic acid.

5. A method according to claim 1 wherein the hydroxamic acid is caprylohydroxamic acid.

* * * * *